US009806844B2

(12) United States Patent
Hu et al.

(10) Patent No.: US 9,806,844 B2
(45) Date of Patent: Oct. 31, 2017

(54) ELECTROMAGNETIC SIGNAL TRANSPORT AND DISTRIBUTION SYSTEM

(71) Applicant: PERFECTVISION MANUFACTURING, INC., Little Rock, AR (US)

(72) Inventors: Yiping Hu, Little Rock, AR (US); William B Lutz, Little Rock, AR (US); Daniel Webber, Little Rock, AR (US); Richard Gaither, Jacksonville, AR (US); Charles Darwin Davidson, Jr., Little Rock, AR (US)

(73) Assignee: PerfectVision Manufacturing, Inc., Little Rock, AR (US)

( * ) Notice: Subject to any disclaimer, the term of this patent is extended or adjusted under 35 U.S.C. 154(b) by 0 days.

(21) Appl. No.: 14/937,596

(22) Filed: Nov. 10, 2015

(65) Prior Publication Data

US 2016/0134374 A1    May 12, 2016

Related U.S. Application Data

(60) Provisional application No. 62/077,370, filed on Nov. 10, 2014.

(51) Int. Cl.
*H04B 10/2575* (2013.01)
*H04J 14/02* (2006.01)
*H04B 10/25* (2013.01)

(52) U.S. Cl.
CPC ........ *H04J 14/023* (2013.01); *H04B 10/2503* (2013.01); *H04B 10/25753* (2013.01); *H04B 10/25758* (2013.01); *H04J 14/0238* (2013.01)

(58) Field of Classification Search
CPC ................ H04B 10/2575–10/2581; H04J 14/02–14/0252
See application file for complete search history.

(56) References Cited

U.S. PATENT DOCUMENTS

| | | | | |
|---|---|---|---|---|
| 5,644,622 A * | 7/1997 | Russell | ............... | H04W 88/085 370/338 |
| 6,108,112 A * | 8/2000 | Touma | ............... | H04B 10/07 398/1 |
| 6,718,553 B2 * | 4/2004 | Kenworthy | ........ | H04N 7/17318 348/E7.071 |
| 8,699,881 B1 * | 4/2014 | Iannone | ............. | H04J 14/0221 398/100 |
| 8,917,991 B2 * | 12/2014 | Mysore | ............... | H04J 14/0226 398/115 |
| 2001/0030785 A1 * | 10/2001 | Pangrac | ................... | H04N 7/22 398/72 |
| 2002/0063924 A1 * | 5/2002 | Kimbrough | ......... | H04B 10/272 398/79 |

(Continued)

OTHER PUBLICATIONS

ARRL: "Cable Television Interference", Oct. 26, 2015, http://www.arrl.org/cable-television-interference.*

(Continued)

*Primary Examiner* — Li Liu
(74) *Attorney, Agent, or Firm* — Ocean Law; Paul D. Chancellor (57) ABSTRACT

An electromagnetic signal transport and distribution system and method provides for aggregating signals from multiple transport media and for distributing the signals to multiple end points in one or multiple formats to suit end user devices.

10 Claims, 7 Drawing Sheets

(56) References Cited

U.S. PATENT DOCUMENTS

| | | | | |
|---|---|---|---|---|
| 2004/0022536 A1* | 2/2004 | Koh | ............. | H04B 10/272 |
| | | | | 398/41 |
| 2004/0057728 A1* | 3/2004 | Kim | ............. | H04B 10/1149 |
| | | | | 398/72 |
| 2005/0069318 A1* | 3/2005 | Lee | ............. | H04J 14/0226 |
| | | | | 398/67 |
| 2005/0138670 A1* | 6/2005 | Ploumen | ............. | H04J 14/02 |
| | | | | 725/118 |
| 2005/0172328 A1* | 8/2005 | Park | ............. | H04J 14/0226 |
| | | | | 725/129 |
| 2006/0020975 A1* | 1/2006 | Kenny | ............. | H04B 10/25751 |
| | | | | 725/63 |
| 2008/0304830 A1* | 12/2008 | Huang | ............. | H04J 14/0226 |
| | | | | 398/79 |
| 2010/0296156 A1* | 11/2010 | BuAbbud | ............. | H04B 10/2918 |
| | | | | 359/341.2 |
| 2011/0283330 A1* | 11/2011 | Wang | ............. | H04B 1/18 |
| | | | | 725/69 |
| 2012/0087672 A1* | 4/2012 | Han | ............. | H04B 10/25754 |
| | | | | 398/115 |
| 2015/0131999 A1* | 5/2015 | Urban | ............. | H04B 10/40 |
| | | | | 398/76 |

OTHER PUBLICATIONS

Wiki: "CATV Interference", Sep. 5, 2015, http://wiki.radioreference.com/index.php/CATV_Interference.*
LBA: "Can LTE 4G Create Interference With Cable TV? Yes!", Jan. 28, 2011, https://www.lbagroup.com/blog/author/admin/.*
Whitelock: "Understanding and controlling RF interference", Feb. 1, 1999, http://www.svconline.com/news/understanding-and-controlling-rf-interference/364849.*

\* cited by examiner

ELECTROMAGNETIC SIGNAL TRANSPORT AND DISTRIBUTION SYSTEM

CROSS REFERENCE TO RELATED APPLICATIONS

This application is based upon, and claims priority from, prior U.S. Provisional Pat. App. No. 62/077,370 filed Nov. 10, 2014, entitled "Electromagnetic Signal Transport and Distribution System" by coinventors Yiping Hu, William Lutz, Daniel Webber, and Richard Gaither.

BACKGROUND OF THE INVENTION

Field of the Invention

The invention relates to the field of electromagnetic signal transport and distribution. More particularly, the present invention relates to systems and methods for transporting and distributing signals in radio frequency and light portions of the electromagnetic spectrum.

Discussion of the Related Art

Electromagnetic signals are commonly transported in radio frequency and infrared portions of the electromagnetic spectrum. Transport media includes metallic cables for transporting radio frequency signals and fiber optic cables for transporting optical signals such as infrared signals.

Widespread use of fiber optic cables for long haul signal transport provides orders of magnitude more bandwidth over orders of magnitude longer distances as compared with copper cables such as a twisted pair of copper wires. However, unlike long haul signal transport, signal distribution systems tend to be local to users and are more likely to use lower cost copper cabling given distribution bandwidth requirements typically do not require the capacity offered by fiber optic cables.

Fiber optic transmission, receiving, and conditioning equipment also represents a significant cost hurdle as compared with required metallic cable counterparts. For example, fiber optics transmit, amplify, receive, and split equipment costs for either of dense wavelength division multiplexing ("DWDM") equipment (e.g., 0.8 nm channel spacing) or coarse wavelength division multiplexing ("CWDM") equipment (e.g., 20 nm channel spacing) far exceed the costs of counterpart equipment required for twisted pair and coaxial cable signals.

Converting signals from mixed transport media into a common format usable at signal end points is a problem that is multiplied by an abundance of signal sources in multiple locations which may be proximate the signal end point (e.g., "within sight") or far from the signal end point (e.g., kilometers/miles away).

Signal transport and distribution systems that readily accommodate geographically diverse signals carried on multiple transport media while delivering a usable signal(s) at a signal end point or multiple signal end points are rare, especially in commercial and dwelling unit applications where the cost of sophisticated signal handling equipment is prohibitive.

SUMMARY OF THE INVENTION

A signal transport and distribution system and method aggregates and delivers multiple signals to multiple signal end points. In an embodiment, a signal transport and distribution system for users with cable television, off-air television, satellite television and internet services: a signal combining section coupled with a signal distribution section via one bidirectional single-mode optical fiber; the signal combining section including a first multiplexer with coaxial cable and fiber inputs; the coaxial cable inputs for interconnection with the facilities of one or more multimedia signal providers via at least one direct broadcast satellite ("DBS") antenna, each antenna having at least one low noise block down converter; the fiber inputs for interconnection with facilities of an internet services provider via an optical line termination; the signal path between a low noise block downconverter and a respective first multiplexer port not exceeding a distance of 150 feet; and, the signal distribution section including a demultiplexer with plural coaxial outputs and a fiber output, a second multiplexer for aggregating the coaxial outputs for transport on one aggregated signal coaxial cable, and an optical network unit interconnecting the fiber output and an Ethernet connection; wherein an end user receives bidirectional internet services via the Ethernet connection and satellite television services via the aggregated signal coaxial cable.

DETAILED DESCRIPTION OF THE PREFERRED EMBODIMENTS

The disclosure provided in the following pages describes examples of some embodiments of the invention. The designs, figures and description are non-limiting examples of the embodiments they disclose. For example, other embodiments of the disclosed device and/or method may or may not include the features described herein. Moreover, disclosed advantages and benefits may apply to only certain embodiments of the invention and should not be used to limit the disclosed invention.

As used herein, the term "coupled" includes direct and indirect connections. Moreover, where first and second devices are coupled, intervening devices including active devices may be located therebetween.

This application incorporates by reference, in its entirety and for all purposes, ANSI/SCTE 174 2010 Radio Frequency over Glass Fiber-to-the-Home Specification.

Figure 1:
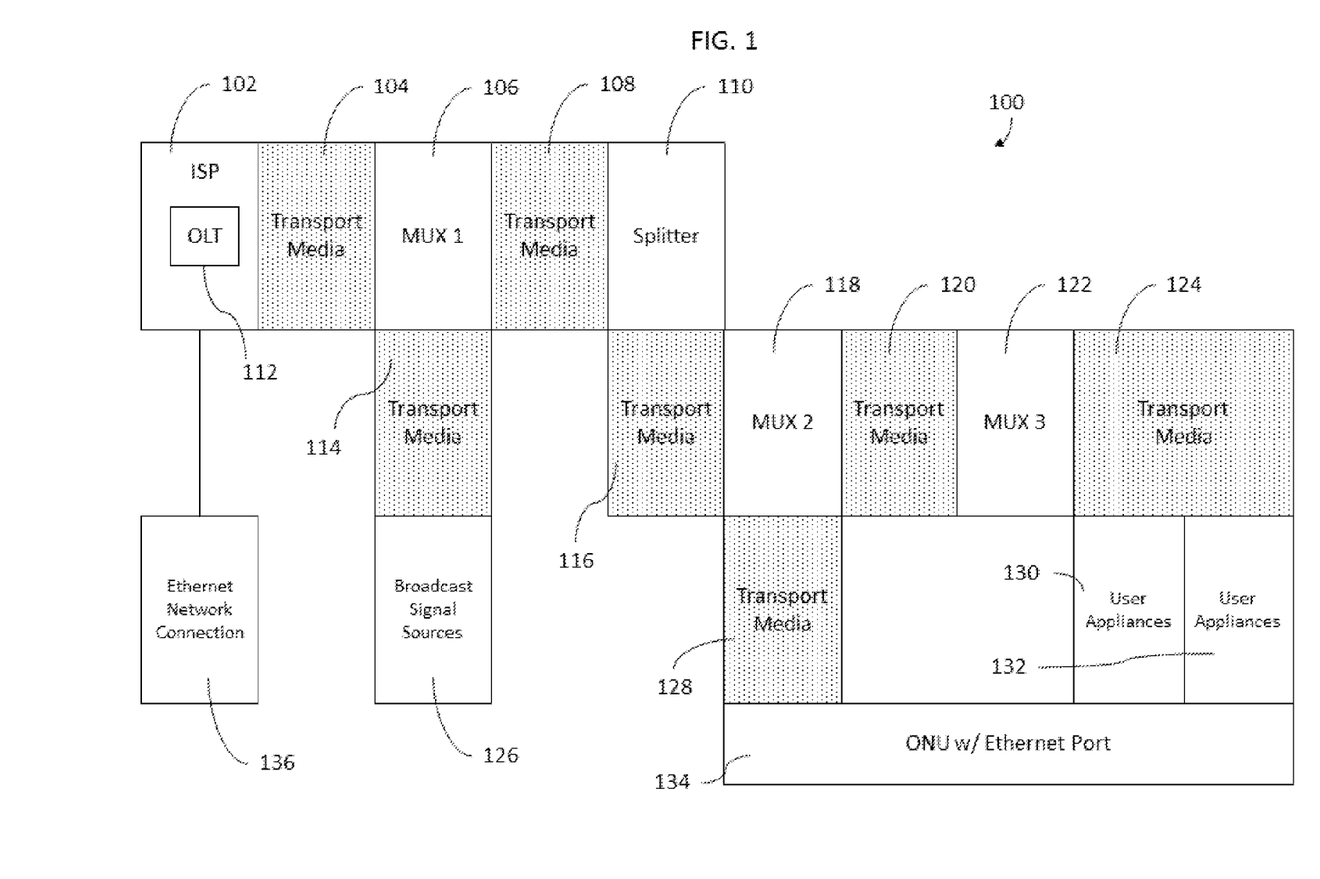
FIG. 1 shows a block diagram illustrating a signal transport and distribution system in accordance with the present invention.

FIG. 1 is a block diagram 100 illustrating a signal transport and distribution system in accordance with the present invention. In the diagram, signals originate with the Internet Service provider ("ISP") 102 and/or a line end device such as an optical line terminator ("OLT") 112, the broadcast signal sources 126 such as direct broadcast satellite ("DBS") satellite low noise block downconverter ("LNB") outputs, off-air antenna outputs, or cable television ("CATV") outputs, and in some embodiments with the user appliances 130. Signal end points include one or more user appliances 132. User appliances include televisions, computers, phones and other devices equipped to originate or receive available electromagnetic signals. To the extent a user appliance, for example a computer, sends and receives signals, it is represented by blocks 130, 132.

A first multiplexer 106 receives signals from the ISP/OLT 102/112 and via transport media 104 and from broadcast signal sources via transport media 114. As skilled artisans will recognize, the broadcast signals and the ISP/OLT signal are typically transported on different transport media. The broadcast signals may be radio frequency ("RF") signals, for example signals from a LNB with frequencies in the range of 200 to 2150 MHz, from an off-air antenna with frequencies of 30 to 1000 MHz, or from a CATV system with frequencies of 52-1002 MHz. These broadcast signals may be transported on coaxial cable (e.g., RG 59/U, RG 6/U, RG 11/U) while the ISP/OLT signal may be transported on glass/fiber optic cable, an arrangement which requires media conversion within or in addition to the multiplexer. Multiplexed onto transport media 108, the ISP/OLT and broadcast signals reach a splitter 110.

At least one port of the splitter 110 is interconnected with a second multiplexer 118 via transport media 116 where the ISP/OLT 102/112 signal and the broadcast signals are demultiplexed. As skilled artisans will recognize, the broadcast signals and the ISP/OLT signal are typically transported on different transport media. For example the satellite signals may be radio frequency ("RF") signals transported on coaxial cable[1] while the ISP/OLT signal may be typically transported on glass/fiber optic cable, an arrangement which requires media conversion within or in addition to the multiplexer.

[1] http://www.corning.com/opcomm/nafta/en/markets_applications/evolant/fastaccess/altos.aspx. See e.g., Corning Altos fiber optic cable products.

Transport media 128 interconnects a port of the second multiplexer 118 with an optical line end piece such as an optical network unit ("ONU") 134 which supports an Ethernet port for communications such as bidirectional communications with user appliances 130, 132.

Transport media 120 interconnects the second multiplexer's demultiplexed satellite signals/ports with a third multiplexer 122 (e.g. a DIRECTV® single-wire multiswitch ("SWM") device as described in U.S. Pat. Nos. 7,788,694, 7,900,230 and 8,627,382) that multiplexes and sends the broadcast signals via transport media 124 to user appliances 132.

As explained in part above, operation of the signal transport and distribution system optionally offers bidirectional exchange of selected signals. In an embodiment, for signals traveling through the system 100 from the ISP to the user appliances 132, the first multiplexer 106 multiplexes signals onto a single line 108, the second multiplexer 118 demultiplexes signals onto multiple lines 120, and the third multiplexer 122 multiplexes signals onto a single line 124. And, in an embodiment, for signals traveling through the system 100 from the user appliances 130 toward to the broadcast signal sources, the third multiplexer provides multiplexing means such as a switch, the second multiplexer multiplexes the signal onto a single line and to the extent the signal is for the broadcast signal sources (e.g., satellite LNBs), the first multiplexer demultiplexes the signal.

Operation of the signal transport and signal distribution system 100 optionally offers bidirectional exchange of user appliance signals 132 such as user appliance 130/computer originated Ethernet signals. Here, the user originated Ethernet signal reaches the ISP 102 via the ONU 134 and the second and first multiplexers, for example by a data channel associated with these multiplexers which may be aggregated onto a single line 116, 108, 104 as needed for transport.

In an embodiment, satellite control signals such as signals originated from a user appliance 130/user set top box are sent to the broadcast signal sources. For example, a set top box may utilize the ONU Ethernet port for sending signals and the broadcast signal sources may use an Ethernet network connection 136 local to the broadcast signal sources for receiving signals. In another embodiment, control signals remain in the system and are sent to the broadcast signal sources via the third, second, and first multiplexers, for example by a data channel associated with each of these multiplexers which may be aggregated onto a single line 120, 116, 108 as needed for transport. In various embodiments, transport media 108 is single mode optical fiber and in various embodiments one or more of transport media 104, 116, 128 are single mode optical fiber.

In some embodiments ISP/OLT may be a source of cellular wireless signals for the distribution of broadband and telephony services. Cellular signals originate with ISP/OLT 102/112 and are transported via transport media 104, 108, 116, 128 to ONU 134 for distribution of the cellular wireless signals to end user equipment. In some embodiments ONU 134 may be a distributed antenna system ("DAS") for cellular wireless communication.

In an embodiment, cellular wireless signals are sent to a cellular network. For example a DAS may utilize the ONU for sending cellular signals to a cellular network via ONU 134, transport media 128, 116, 108, 104 and ISP/OLT 102/112.

Figure 2:
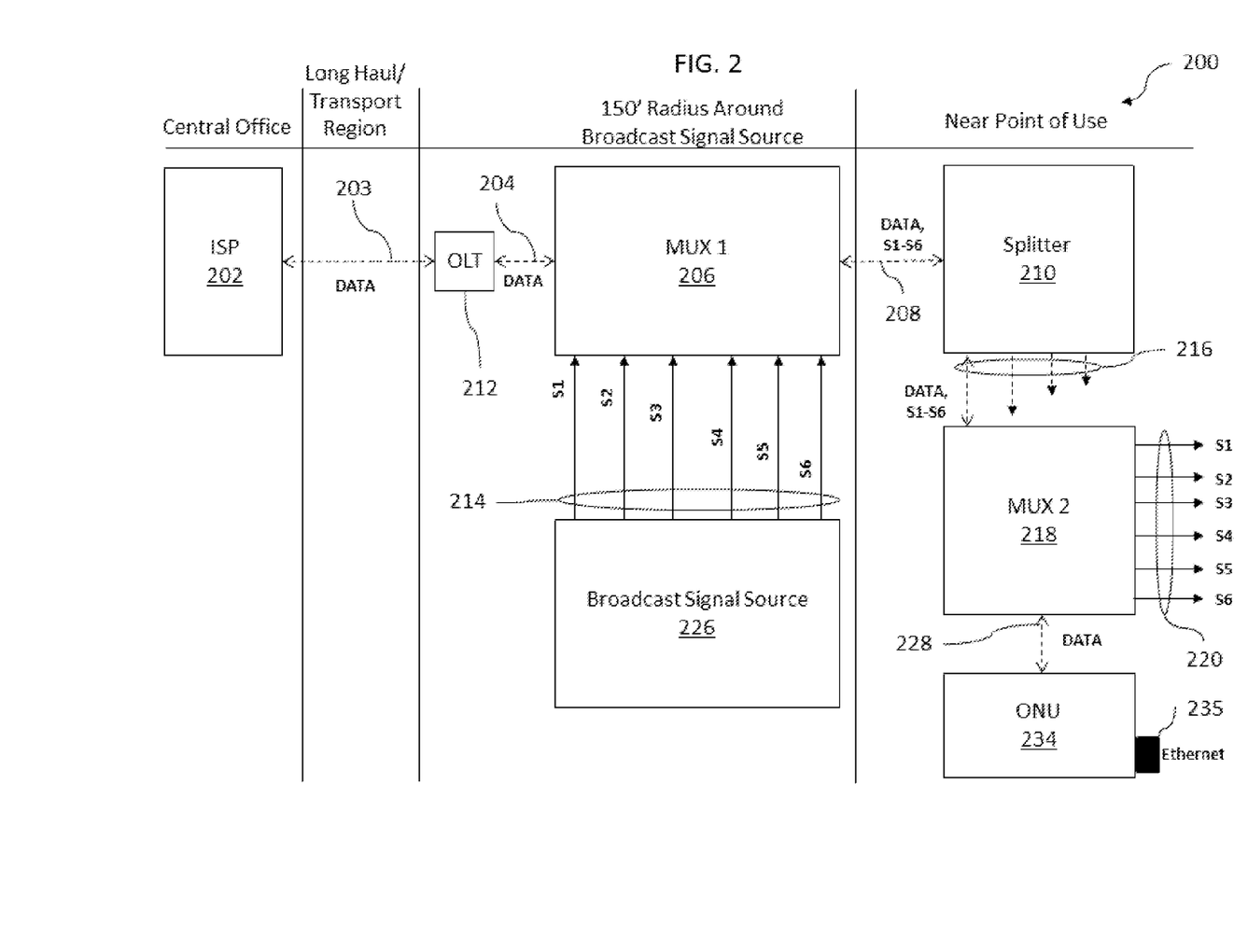
FIG. 2 shows an embodiment of the signal transport and distribution system of FIG. 1

FIG. 2 is a schematic diagram 200 illustrating an embodiment of the signal transport and distribution system of FIG. 1. In the diagram, signals originate with the ISP/OLT 202/212, the broadcast signal source 226, and in some embodiments with devices (not shown) using an Ethernet port 235 associated with an ONU 234. Signal endpoints include any user devices that a) may interconnect with the Ethernet port 234 and b) may interconnect via ports 220 to receive signals S1-S6 of a second multiplexer 218. User appliances include televisions, computers, phones and other devices equipped to originate or receive available electromagnetic signals.

A first multiplexer 206 interconnects with the OLT 212 via fiber optic transport media 204 for conveying data and/or data channel signals ("DATA") from ISP 202 via transport media 203. Such ISP transport media 203 commonly extends over long distances that may be ones, tens, and hundreds of kilometers long and is referred to herein as "long haul" or "transport region" transport media.

The first multiplexer 206 also interconnects with a broadcast signal source which is the source of plural signals which may be signals of one or more providers, for example DIRECTV® and/or DISH® satellite television signals, off-air antenna television signals, and CATV television signals.

In various embodiments, the broadcast signal source 226 includes one or more of satellite antennas (e.g., dishes), LNB, satellite receivers and related DBS equipment. The transport media 214 between the broadcast signal source and the first multiplexer provides for conveying plural separate satellite signals, for example, six LNB intermediate frequency signals S1 through S6 carried on six separate transport paths. In various embodiments, the transport media 214 is copper or metallic such as six coaxial cables, six twisted pair, or a combination of metallic cables providing six separate signal paths. In other embodiments broadcast signal source 226 may also include off-air antennas and CATV drop cables.

As mentioned above, broadcast signals may be acquired from one or more DBS satellite signal sources, for example using suitable DBS dish antennas. Here, the metallic transport media 214 length is limited such that the first multiplexer 206 and the DBS antenna dish(es) are typically located in close proximity to each other. In some embodiments they are located within X feet of each other where X is one of 100 feet, 125 feet, 150 feet, 175 feet, 200 feet or less than 1000 feet. In an embodiment, X is limited to 150 feet or less. And, in some embodiments the first multiplexer and the dishes are located and transport media 214 routed such that the length of the transport media 214 carrying the DBS signal does not exceed Y feet where Y is one of 100 feet, 125 feet, 150 feet, 175 feet, 200 feet or less than 1000 feet. In an embodiment, Y is limited to 150 feet or less.

As skilled artisans will recognize, the mix of broadcast signals on metallic media and ISP/OLT 202/212 signals on glass media will require media conversion within or in addition to the multiplexer. Multiplexed onto transport media 208, the ISP/OLT signal DATA and broadcast signals S1-S6 reach a splitter 210. In some embodiments, the transport media 208 is glass, e.g., a single fiber optic cable.

As shown, the splitter 210, second multiplexer 218 and ONU 234 are located near the point of use. For example, these items of equipment might be located in a telecommunications rack or closet of a multi-dwelling or multi-occupancy building. Some embodiments may include multiple splitters to enable a larger distribution network of the signals, for example distribution to a number of multistory buildings on a campus or city block.

The splitter 210 has at least one port that is interconnected with a second multiplexer 218 via transport media 216. The multiplexed signal conveyed by the transport media 216 is demultiplexed in the second multiplexer to provide seven separate signals, DATA and S1 through S6, at second multiplexer ports. Transport media 228 interconnects a second multiplexer DATA port and a corresponding port on an ONU 234 that supports the earlier mentioned Ethernet port 235.

In an embodiment, the second multiplexer 218 receives an optical signal from the splitter 210 and in turn provides an optical connection for interconnecting with the ONU 234 via transport media 228. And, in an embodiment, the second multiplexer includes or is associated with media converters that provide media conversions to metallic cable connections such as coaxial cable connections at ports corresponding to broadcast signals S1-S6.

Figure 3:
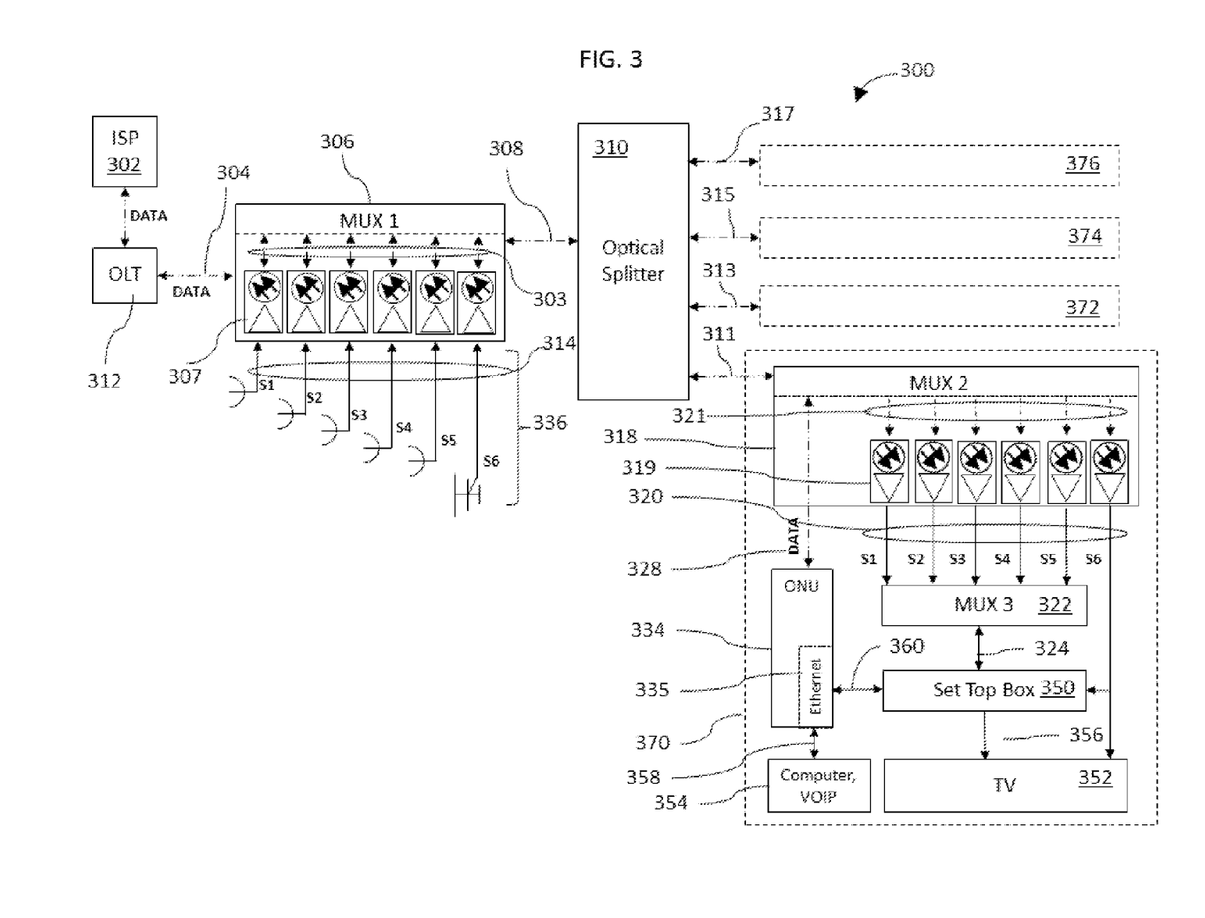
FIG. 3 and FIG. 5 shows embodiments of the signal transport and distribution system of FIG. 1.
Figure 5:
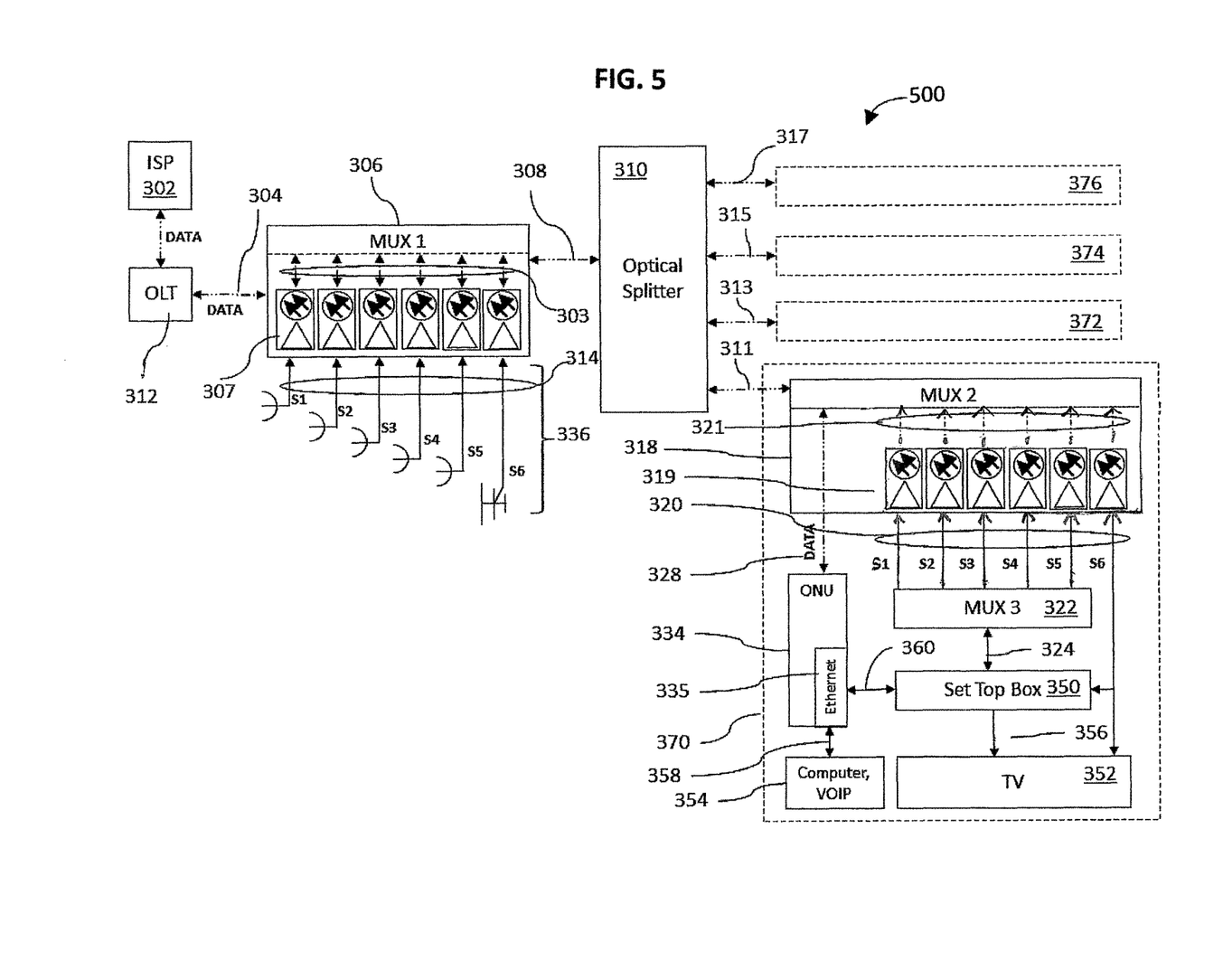

FIG. 3 and FIG. 5 are schematic diagrams 300-500 illustrating embodiments of the signal transport and distribution system of FIG. 1. In the diagrams, signals originate with the ISP 302 via OLT 312, the broadcast signal source 336, and in some embodiments with devices using an Ethernet port 335 associated with an ONU 334. As shown, a computer and/or VOIP device 354 and a television set top box 350 may exchange signals via the Ethernet connection.

Signal endpoints include any user devices that a) may interconnect with the Ethernet port 335 and b) may interconnect via ports 320 to receive signals S1-S6 of a second multiplexer 318. User appliances include televisions, computers, phones such as VOIP phones and other devices equipped to originate or receive available electromagnetic signals. As shown, signal endpoints include a television 352 via an interconnected 356 set top box 350 and a computer and/or VOIP phone(s) 354 interconnected 358 with the Ethernet connection 335 of an ONU 334.

A first multiplexer 306 includes a fiber optic port and plural copper ports. In an embodiment, the fiber optic port provides fiber connection for DATA 304 and six copper ports in the form of coaxial cable ports provide six connections with corresponding coaxial to fiber optic media converters 307.

As shown, transport media 304 provides a fiber optic DATA path between the OLT 312 and the first multiplexer 306. In the first multiplexer, the DATA signal is multiplexed with six optical signals 303. The optical signals 303 are derived from broadcast signal sources, for example DBS satellite and off-air receiving means 336 having coaxial outputs 314 that are reformatted by media converters 307 with optical outputs 303.

The first multiplexer and a splitter are interconnected by fiber optic transport media 308. In various embodiments, the transport media 308 is a single mode optical fiber. Plural splitter ports such as splitter ports 311, 313, 315, 317 provide means for interconnecting corresponding user blocks 370, 372, 374, 376.

An exemplary user block 370 illustrates functionality that might be used to support one or more dwelling units. A user block or second multiplexer 318 is connected with the splitter 310 via a fiber optic cable 311. In some embodiments, only a single strand of fiber is active in the fiber optic cable 311.

In the second multiplexer 318, the signals on the transport media 311 are demultiplexed into individual signals including the DATA signal 328 and the broadcast signals S1-S6. The broadcast signals demultiplexed as light 321 undergo media conversions 319 to provide six reformatted signals for transport on metallic or coaxial cable.

In various embodiments, a DATA port of the second multiplexer is interconnected with an ONU 334 via fiber optic transport media 328. Five coaxial ports of the second multiplexer providing broadcast signals S1-S5 are interconnected with a third multiplexer 322 via coaxial transport media 320. A sixth coaxial port of the second multiplexer providing broadcast signal S6 is interconnected with a set top box 350 or TV 352.

And, in various embodiments a third multiplexer 322 provides for multiplexing the five of the six coaxial broadcast signals 320 for transport on a single coaxial cable. An interconnecting coaxial cable 324 interconnects the third multiplexer and a user presentation and/or display system component(s).

As shown, an implementation supporting a television 352 includes a set top box 350 interconnected with the third multiplexer 322 via a metallic or coaxial cable 324 and interconnected with the television via a metallic or HDMI cable 356. In some embodiments, the set top box also interconnects via an Ethernet port 335 of the ONU 334 via an Ethernet cable 360. The same Ethernet port 335 is available to support a computer 354 and/or other digital devices having Ethernet capability, for example via a router or switch.

As explained in part above, operation of the signal transport and distribution system offers bidirectional exchange of selected signals. In an embodiment utilizing the third multiplexer 322 where signals travel through the system 300 from the OLT 312 to the user appliances (one or more of 350, 352, 354), the first multiplexer 306 multiplexes signals onto a single line 308, the second multiplexer 318 demultiplexes signals onto multiple lines 320, and the third multiplexer 322 multiplexes signals onto a single line 324. And, for signals originating from the user appliances (one or more of 350, 352, 354), the third multiplexer 322 provides multiplexing means such as a switch, the second multiplexer 318 multiplexes the signal onto a single line 311, and to the extent a signal is for the broadcast signal sources 336, the first multiplexer demultiplexes the signal for transport via coaxial transport media 314. In an embodiment, the set top box 350 receives and originates signals in the manner described in this paragraph.

In a bidirectional signal exchange embodiment that may operate alone or in addition to the embodiment of the previous paragraph, for signals traveling through the system 300 from the OLT 312 to the user appliances (one or more of 350, 352, 354), the first multiplexer 306 multiplexes signals onto a single line 308, the second multiplexer 318 demultiplexes signals onto multiple lines including a data channel on transport media 328. Transport media 328 interconnects the second multiplexer 318 data channel and the ONU 334 which supports the Ethernet port 335. And for signals originating from the user appliances (one or more of 350, 352, 354), the Ethernet port 335 and ONU 334 pass signals to the second multiplexer via data channel transport media 328, the second multiplexer multiplexes these signals onto a single line 311, and the first multiplexer 306 passes these signals to the ISP/OLT via the data channel transport media 304 interconnection. To the extent signals are sent to the broadcast signal sources 336, an embodiment provides for demultiplexing in the first multiplexer and forwarding via one or more lines of the coaxial transport media 314.

In an embodiment, satellite control signals may be sent via the ONU/Ethernet port 334/335 and received at the broadcast signal source 336 via a local or nearby Ethernet network connection (see e.g. the Ethernet network connection 136 of FIG. 1). In another embodiment, satellite control signals remain in the system 300 as described above.

Figure 4A:
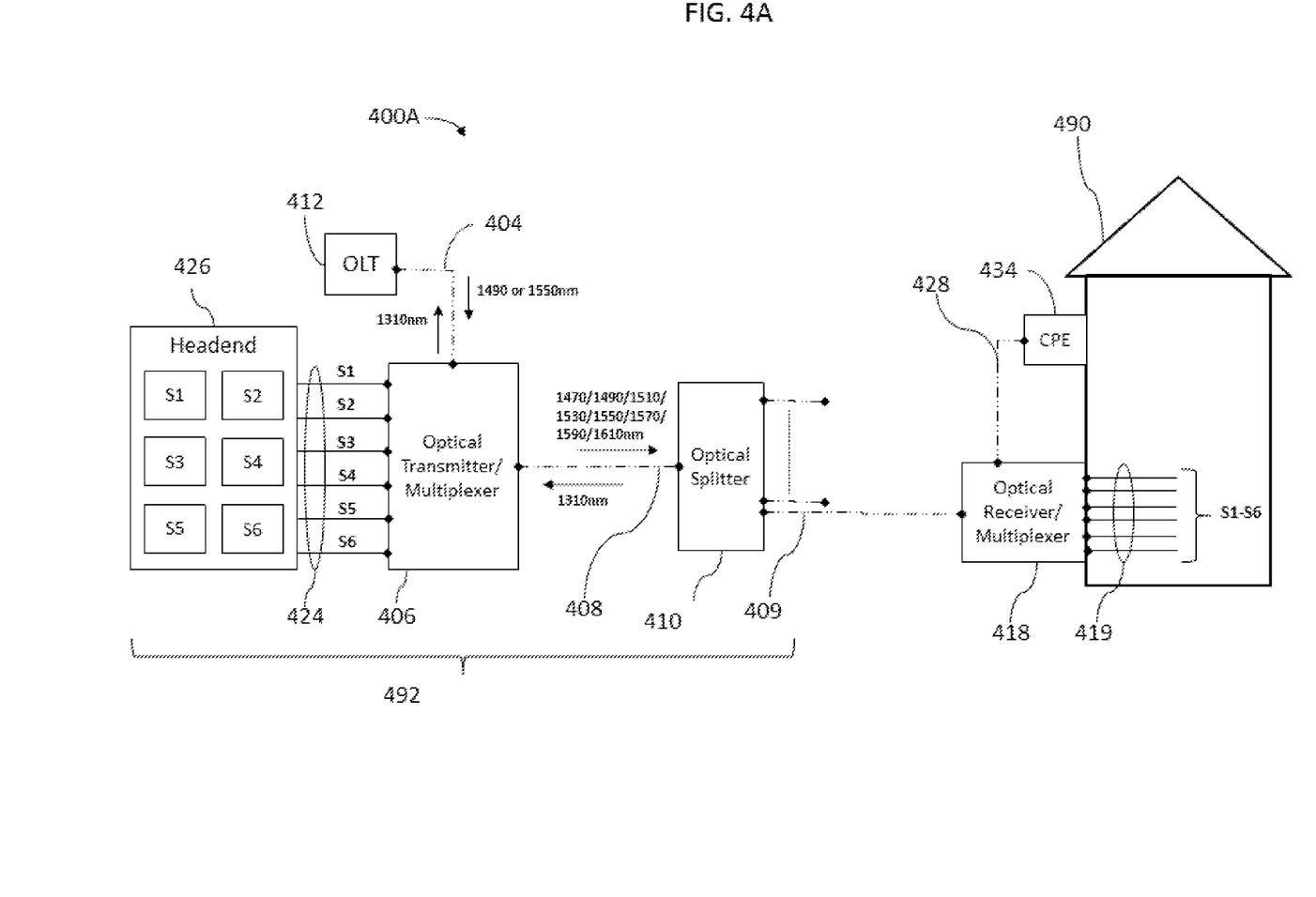
FIG. 4A shows an embodiment of the signal transport and distribution system of FIG. 1
Figure 4B:
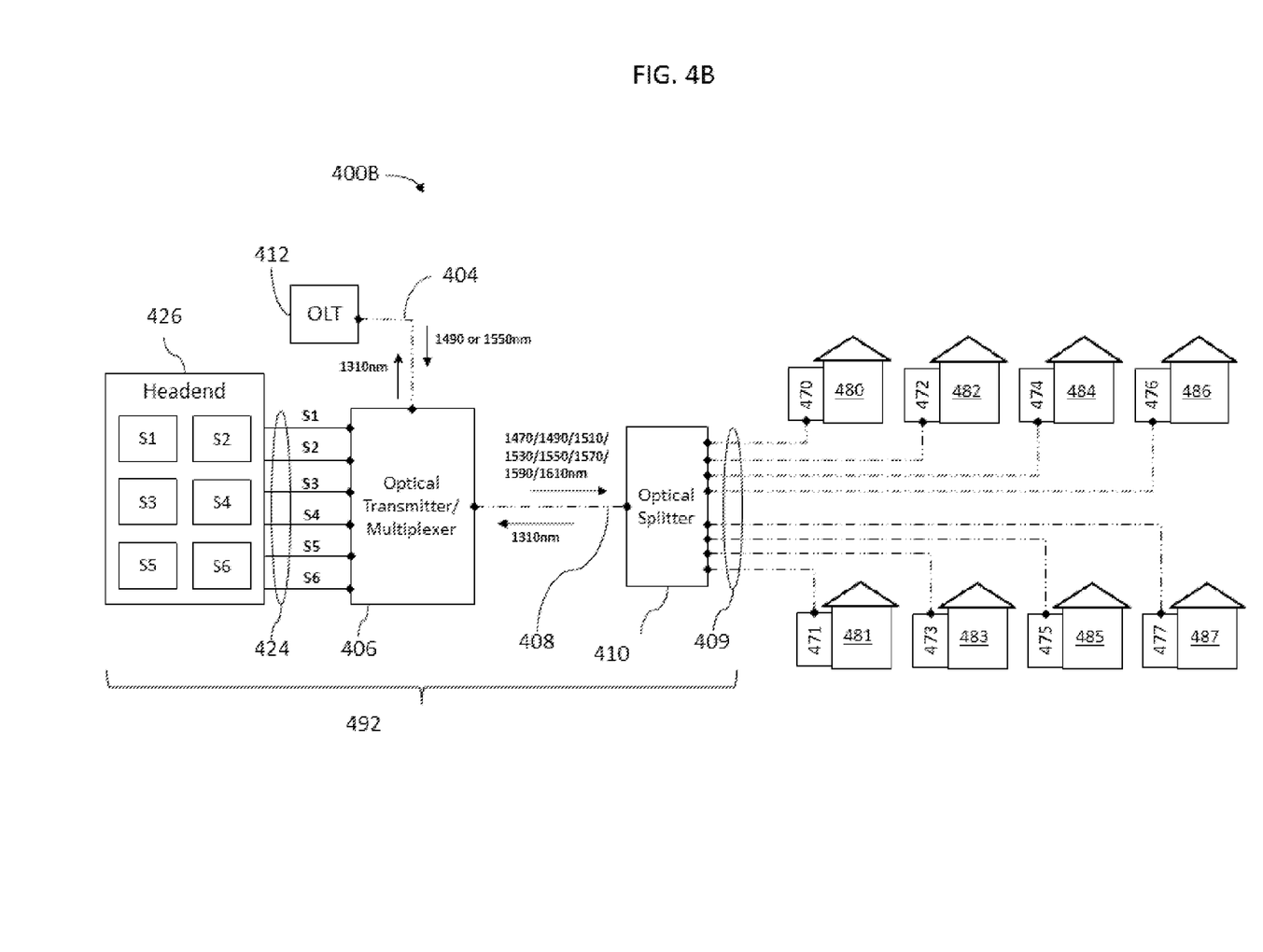
FIG. 4B shows an embodiment of the signal transport and distribution system of FIG. 1.
Figure 4C:
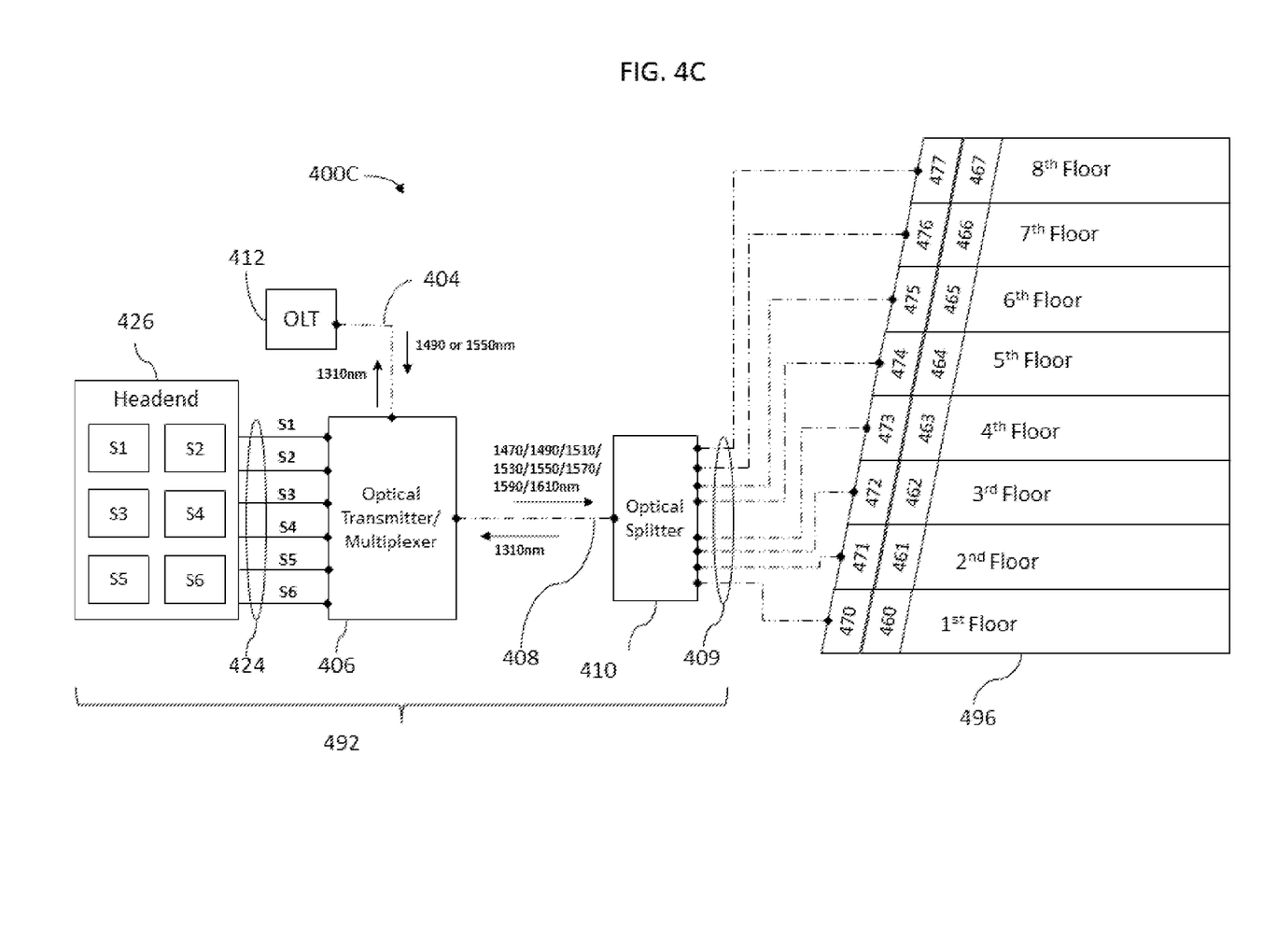
FIG. 4C shows an embodiment of the signal transport and distribution system of FIG. 1

FIGS. 4A-C show applications 400A-C of the electromagnetic signal transport and distribution system of FIG. 1.

In FIG. 4A, an optical delivery front end 492 provides multimedia services to a residential or dwelling unit 490. In particular, the optical delivery front end includes an optical transmitter with a multiplexer 406 interconnected with (i) an OLT 412 via transport media 404 (1490/1550 nm inbound signals from OLT to multiplexer and 1310 nm outbound signals from multiplexer to OLT), (ii) a headend unit such as a multi-antenna broadcast receiving headend 426 via transport media 424 (RF signals typical), and (iii) an optical splitter 410 via transport media 408 and having plural ports 409. The optical splitter ports provide bidirectional communications with multiple residential or dwelling units, unit 490 being typical.

Located proximate, on or within dwelling unit 490, is an optical receiver including a receiver and multiplexer 418. Optical transport media 409 interconnect the optical splitter 410 with the receiver multiplexer 418. Receiver multiplexer ports S1-S6 provide demultiplexed signals 419 originated by the headend 426 while a port of the multiplexer interconnects with customer premises equipment ("CPE") 434 via transport media 428. Transport media 428 may be Ethernet cable such as 10BASE-T metallic cable or it may be optical cable. In some embodiments, both metallic and optical cables interface with customer premises equipment.

In FIG. 4B, an optical delivery front end 492 provides multimedia services to a group of residences or dwelling units 480-487. In particular, the optical delivery front end includes an optical transmitter with a multiplexer 406 interconnected with (i) an OLT 412 via transport media 404 (1490/1550 nm inbound signals from OLT to multiplexer and 1310 nm outbound signals from multiplexer to OLT), (ii) a headend unit such as a multi-antenna broadcast receiving headend 426 via transport media 424 (RF signals typical), and (iii) an optical splitter 410 via transport media 408 and having plural ports 409. The optical splitter ports provide bidirectional communications with multiple residential or dwelling units.

Located proximate on, or within each dwelling unit 480-487, is a respective user block 470-477. These user blocks 470-477 are similar to the user block 370 of FIG. 3.

In FIG. 4C, an optical delivery front end 492 provides multimedia services to floors 1-8 of a multi-floor building. In particular, the optical delivery front end includes an optical transmitter with a multiplexer 406 interconnected with (i) an OLT 412 via transport media 404 (1490/1550 nm inbound signals from OLT to multiplexer and 1310 nm outbound signals from multiplexer to OLT), (ii) a headend unit such as a multi-antenna broadcast receiving headend 426 via transport media 424 (RF signals typical), and (iii) an optical splitter 410 via transport media 408 and having plural ports 409. The optical splitter ports provide bidirectional communications with multiple floors of a multi-floor building.

Located proximate on, or within a building 496 having eight floors, are respective user blocks 470-477, each user block being similar to the user block 370 of FIG. 3. Interconnected with each user block is a corresponding station for wireless communications such as wireless access points 460-467. Among other things, this arrangement provides occupants of each of the floors with wireless internet access.

What is claimed is:

1. A signal transport and distribution system for users with satellite television and internet services:
   a signal combining section coupled with a signal distribution section via one bidirectional single-mode optical fiber;
   the signal combining section including a first multiplexer with coaxial cable and fiber inputs;
   the coaxial cable inputs for interconnection with the facilities of three or more multimedia signal providers via at least three direct broadcast satellite ("DBS") antennas, each antenna having at least one low noise block downconverter;
   the fiber inputs for interconnection with facilities of an internet services provider via an optical line termination;
   the signal path between the low noise block downconverters and respective multiplexer ports not exceeding a distance of 150 feet; and,
   the signal distribution section including
   a demultipelxer with plural coaxial outputs for recovering the mutimedia signals of the plural multimedia signal providers and a fiber output,
   a second multiplexer for aggregating the coaxial outputs for transport on one aggregated signal coaxial cable for delivery of video signals to a television via a set top box,
   an optical network unit interconnecting the fiber output and an Ethernet connection;
   the Ethernet connection shared with the set top box and used by the set top box to send control signals to the first multiplexer; and,
   bidirectional internet services provided via the Ethernet connection and satellite television services provided via the aggregated signal coaxial cable;
   wherein single-mode optical fiber utilizes wavelengths including 1310 nm and three additional different wavelengths.

2. A signal transport and distribution system for users with satellite television and internet services:

an upstream signal transceiver and a plurality of signal transceivers downstream of the upstream signal transceiver;

each of the signal transceivers having a transfer port and a plurality of signal ports;

the upstream transceiver transfer port connected to a splitter via a single-mode optical fiber cable;

each downstream transceiver connected to the splitter via an optical fiber cable;

the downstream signal transceiver signal ports providing bidirectional transfer of three or more signals between the downstream transceiver and the splitter;

wherein a plurality of signals are multiplexed and distributed downstream by receiving signals at plural signal ports of the upstream transceiver, multiplexing the signals in the upstream transceiver, retransmitting the multiplexed signal from the upstream transceiver transfer port to the splitter, splitting the multiplexed signal for distribution to the downstream transceiver transfer ports, demultiplexing the multiplexed signals in the downstream transceiver, and transmitting the demultiplexed signals via the downstream transceiver signal ports to a SWM switch;

wherein a plurality of multiplexed signals are combined and transported upstream by receiving signals at plural signal ports of the downstream transceiver, multiplexing the signals in the downstream transceiver, retransmitting the multiplexed signals from the downstream transceiver transfer port to the splitter, combining the multiplexed signals from plural downstream transceivers in the splitter, forwarding the combined signals to the transfer port of the upstream transceiver, receiving and demultiplexing the multiplexed signals in the upstream transceiver, and transmitting the demultiplexed signals via the upstream transceiver signal ports; and, wherein the single-mode optical fiber utilizes wavelengths including 1310 nm and three additional different wavelengths.

3. The system of claim 2 where the upstream transceiver and downstream transceiver have the same number and type of signal ports.

4. The system of claim 2 where the upstream and downstream transceivers each have signal ports to support radio frequency and optical signals.

5. The upstream transceiver of claim 2 having from three to six radio frequency signal ports and one optical signal port.

6. The downstream transceiver of claim 2 having from three to six radio frequency signal ports and one optical signal port.

7. The splitter of claim 2 capable of splitting the upstream multiplexed signal among one to sixty-four downstream transceivers.

8. The system of claim 2 adapted to receive six radio frequency signals and one optical signal from the upstream transceiver to each downstream transceiver, and one optical signal from each downstream transceiver to the upstream transceiver.

9. The system of claim 2 where the optical fiber is a single mode optical fiber.

10. The system of claim 2 where all optical components are passive.

* * * * *